INVENTOR.
LOUIS C. ZIEGLER
BY
Howard E. Thompson
ATTORNEY

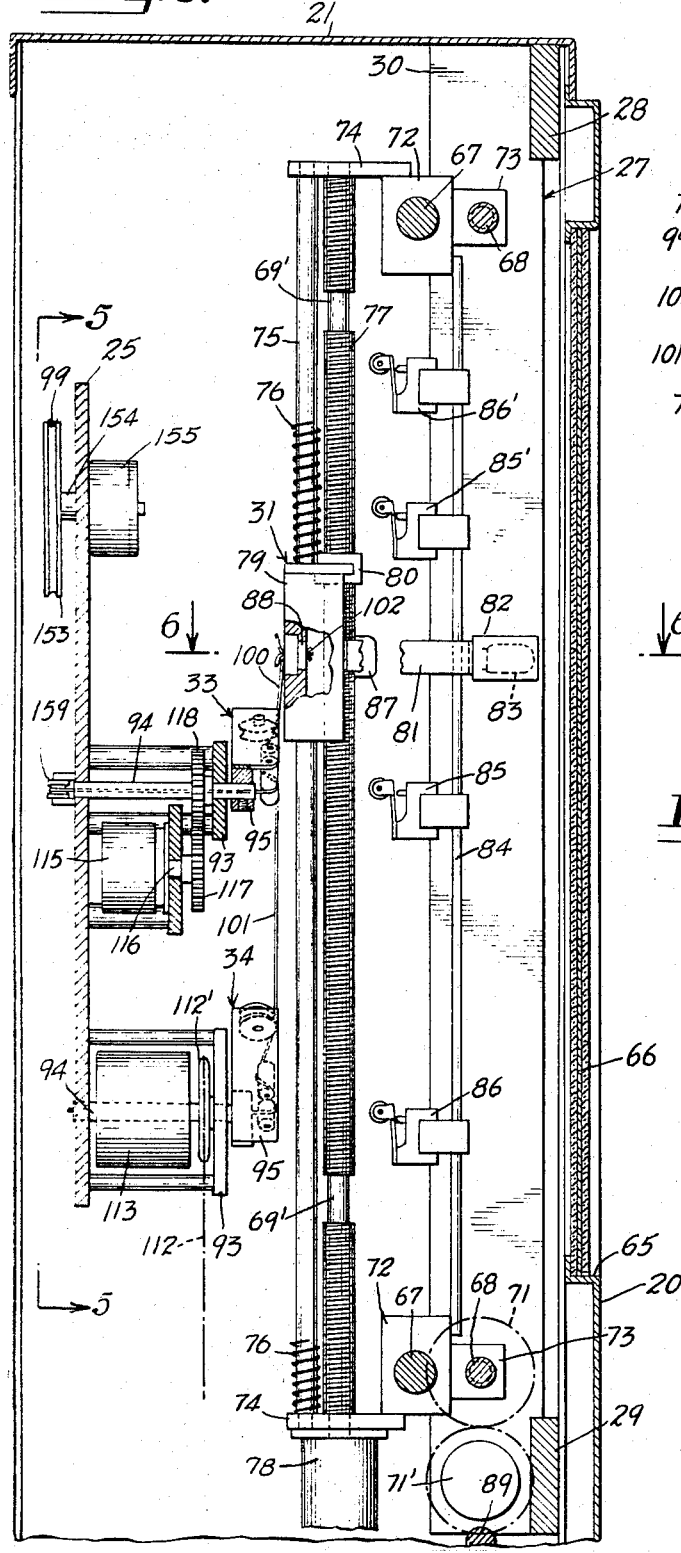

Oct. 7, 1969   L. C. ZIEGLER   3,471,627
APPARATUS FOR SIMULATING NAVIGATION AND
ATTITUDE FLYING OF AIRCRAFT
Filed July 6, 1967   6 Sheets-Sheet 4

INVENTOR.
LOUIS C. ZIEGLER
BY
Howard P. Thompson
ATTORNEY

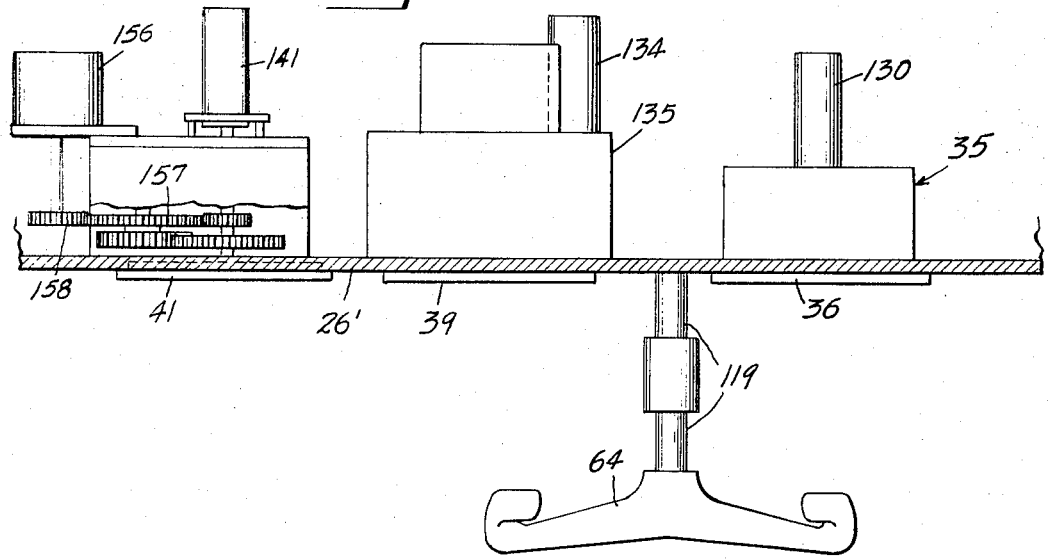
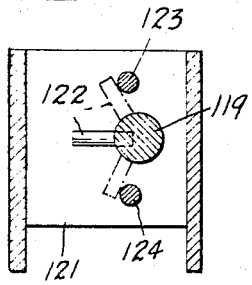
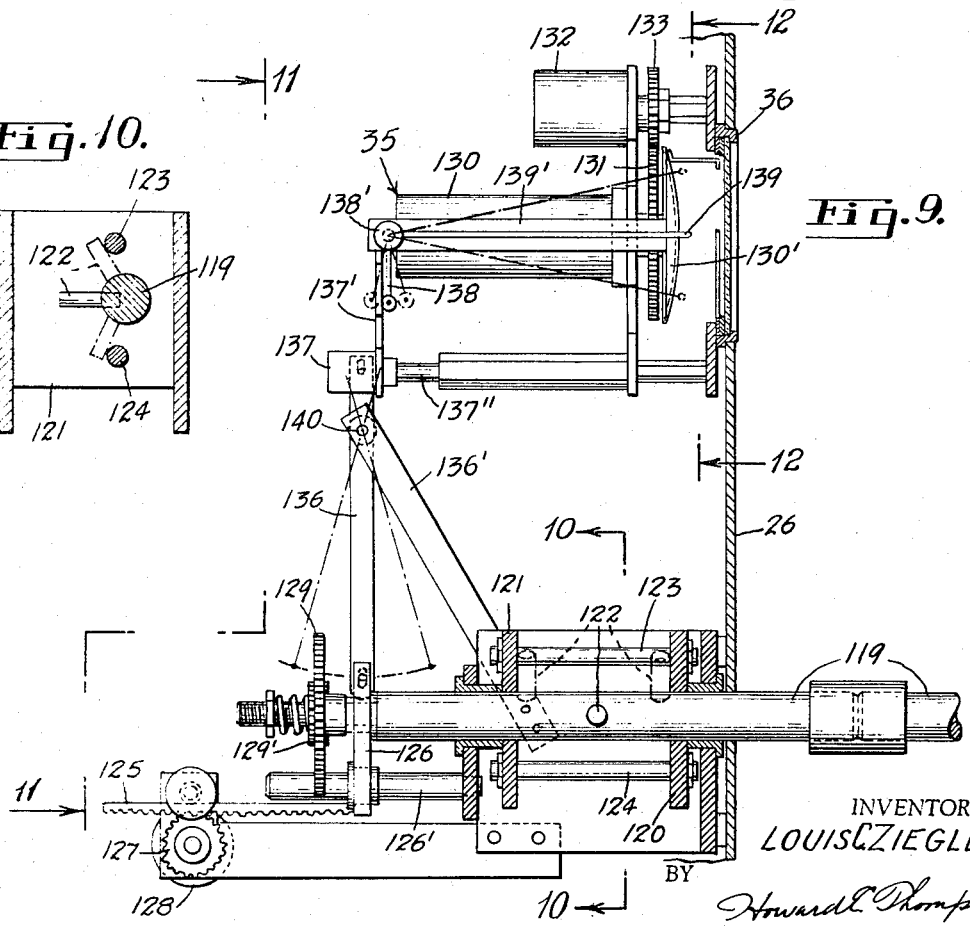

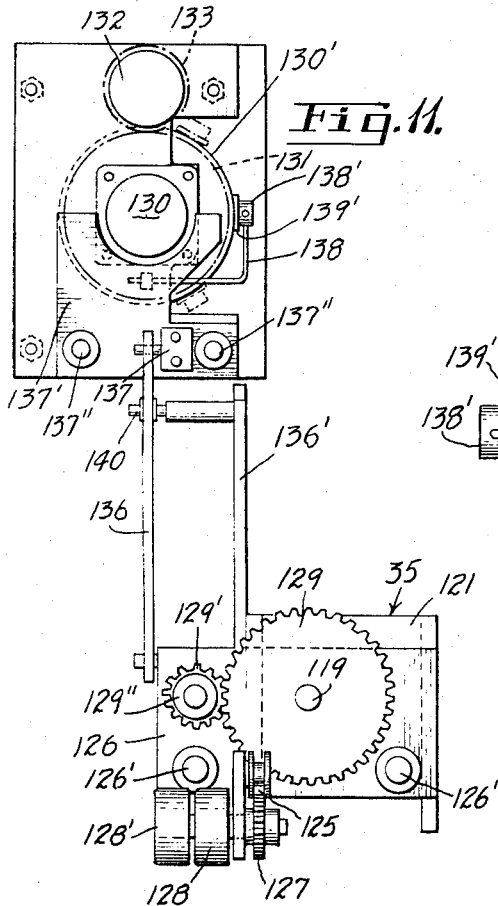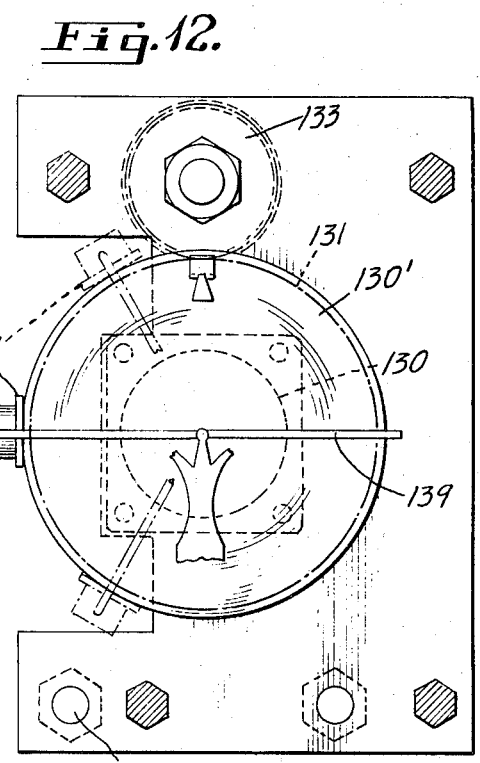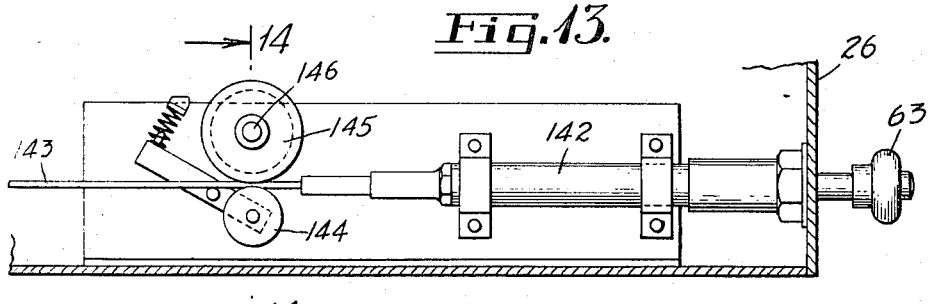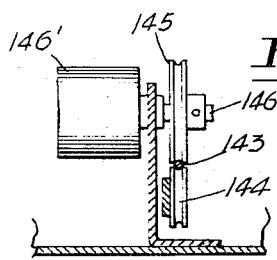

3,471,627
APPARATUS FOR SIMULATING NAVIGATION
AND ATTITUDE FLYING OF AIRCRAFT
Louis C. Ziegler, 5 Skyline Drive,
Englewood Cliffs, N.J. 07632
Filed July 6, 1967, Ser. No. 651,536
Int. Cl. G01s 1/08; G09b 9/08
U.S. Cl. 35—10.2                                16 Claims

ABSTRACT OF THE DISCLOSURE

An apparatus containing fully functioning attitude and navigation instruments of an aircraft controlled exactly as they would be in an aircraft in flight and pictorially indicating the position of the aircraft over the ground relative to the navigation stations and the airports illustrated on a chart and reflected by the navigation instruments on the aircraft instrument panel. The attitude instruments automatically respond to control movements by an operator exactly as they would in the aircraft and the navigation instruments also automatically respond to changes of geographical location exactly as they would in flight.

Background of the invention (1) With apparatus as defined, the distinctive characteristics reside in the use of a number of navigation units, three of which are shown by way of illustration, and the extension of cables from these units to bring ends at a common axis point on what is termed a traveling radar target assembly, supporting a light bulb operating in back of a translucent chart and simulating an airplane moving relatively to said chart, said bulb being in alinement with the axis point and, further, the means controlling universal movement of the assembly with respect to the chart.

(2) To applicant's knowledge, an automatically functioning apparatus of the type and kind defined enabling a student or other operator to perform the various steps and operations in movement of the airplane or target is new in the art and he is aware of no patents defining this structural combination.

Summary of the invention

With applicant's apparatus, a student sitting in front of the panel has access to operation of the various switches, instruments and other controls and, at the same time, can visualize by position of the target bulb or airplane on the chart the operations which are required to be performed in maintaining proper functioning of an airplane at all times while in take-off, in flight and in making a landing at a designated airport.

The novel features of the invention will be best understood from the following description, when taken together with the accompanying drawings, in which certain embodiments of the invention are disclosed and, in which, the separate parts are designated by suitable reference characters in each of the views and, in which:

FIG. 3 is an enlarged partial and broken section on the line 3—3 of FIG. 2, omitting part of the showing.

FIG. 6 is a partial section on the line 6—6 of FIG. 3.

FIG. 8 is a diagrammatic view taken along the line 8—8 of FIG. 1 on an enlarged scale and with parts of the construction broken away.

FIG. 9 is an enlarged diagrammatic section on the broken line 9—9 of FIG. 2.

FIG. 10 is a detail section on the line 10—10 of FIG. 9, omitting parts of the showing.

FIG. 11 is a view, generally looking in the direction of the line 11—11 of FIG. 9, omitting background showing.

FIG. 12 is an enlarged sectional view on the line 12—12 of FIG. 9, showing one of the parts in different positions and dot-dash lines.

FIG. 13 is an enlarged detail sectional view on the line 13—13 of FIG. 2.

FIG. 14 is a detail section on the line 14—14 of FIG. 13; and

FIG. 15 is an enlarged schematic sectional view of one of a number of operating controls, diagrammatically illustrating one of a number of possible positions of a control from a full line to the dot-dash line showing thereof.

Figure 1:
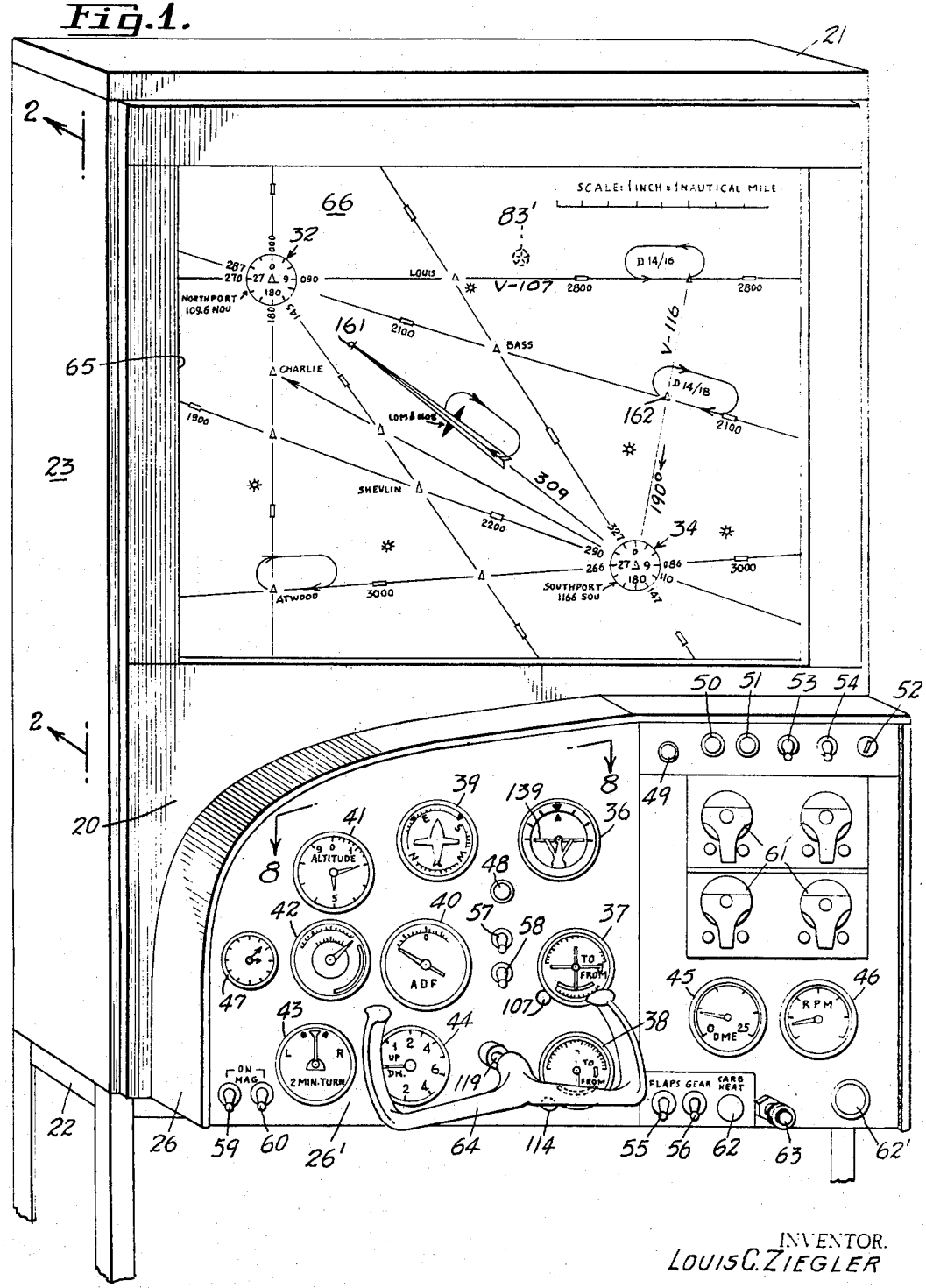
FIG. 1 is a diagrammatic front perspective of the apparatus.
Figure 4:
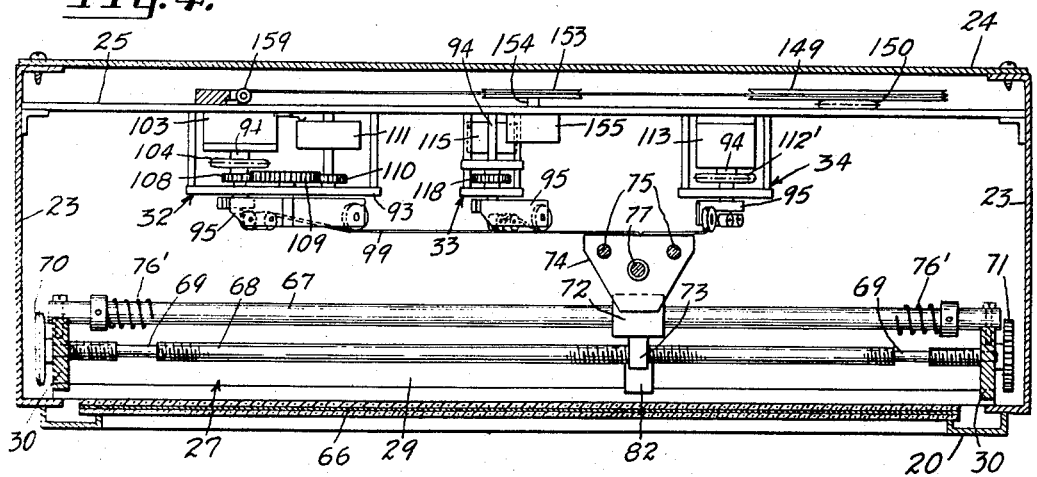
FIG. 4 is a diagrammatic section on the line 4—4 of FIG. 2, indicating the casing and omitting parts of the showing.

In illustrating one adaptation and use of my invention, I have shown an apparatus, comprising a cabinet or casing defined by a front wall 20, a top wall 21, bottom wall 22, side walls 23 and back closure wall 24 (note FIGS. 1, 3 and 4). Supported in the rear upper portion of the casing, inwardly of 24, is a panel or wall 25, best seen in FIGS. 3 and 4, and diagrammatically outlined in FIG. 5, apart from the showing of the casing. Extending outwardly from the lower portion of the front 20 is an instrument housing and panel 26, diagrammatically illustrated in FIG. 1, and positioned in dot-dash lines in FIG. 2 for clear illustration of the various drives which are employed. The front wall of 26 is identified by the reference character 26'.

Mounted at the front upper portion of the casing is a rectangular frame 27, defined by top and bottom plates 28, 29 and side plates 30. The frame 27 includes means supporting and actuating a traveling radar target assembly 31, note FIGS. 2, 3, 4 and 6, which means and assembly are later described in detail.

On the wall 25 are supported three navigation units 32, 33 and 34, FIGS. 2, 3 and 4, as well as other units, later described.

Mounted in the housing and panel 26, 26' is a yoke and artificial horizon assemblage 35, FIG. 9. Considering the front plate 26', FIG. 1, and the diagrammatic showing of FIG. 2, it will appear that a plurality of instruments are mounted in 26 for exposure through the wall 26'. For the time being, these instruments will be generally identified as follows: an artificial horizon 36; visual omni bearing and glide path 37; indicator (OBI) 38; course indicator 39; automatic direction finder (ADF) 40; altimeter 41; air speed 42 and turn indicator 43. Also mounted on the panel are instantaneous vertical speed (Rate of climb) 44; distance measuring indicator (DME) 45 and tachometer 46. Considering FIG. 1, it will appear that on the panel is a clock 47, lights 48, 50 and 51 and the following switches:

marker beacon volume control 49; master switch 52; glide path on-off 53; momentary position light 54; flap actuator 55; landing gear actuator 56; engine on-off 57; position light on-off 58, left magneto on-off 59 and right magneto on-off 60.

Also on the panel are four dummy radio frequency elector switches 61. Slidably mounted in the panel 26' is a carburetor heat control knob 62; a throttle 63 and a dual handgrip stick 64. 62' is a clock for registering the total number of hours of flying the aircraft by a student.

The front wall of the casing has a large rectangular aperture 65, FIGS. 1, 3 and 4, in which is detachably supported, between glass panels, a translucent navigation problem chart 66, later described.

Turning now to the frame 27, it will appear from FIGS. 3 and 4 that slide rods 67 are fixed to upper and lower portions of the sides 30 and rotatable in sides 30, forwardly of 67, are screw shafts 68, having stop movement gaps 69, FIG. 4. At one end of the shafts 68 are drive pulleys 70 coupled by a chain 70' and at the other end of the lower shaft is a driven gear 71 driven by the gear of a motor 71', FIGS. 2 and 3.

Slidably mounted on the rods 67 are blocks 72 having reduced extensions 73 in threaded engagement with the shaft 68. Welded to the block 72 are triangular plates 74 joined by a pair of vertical slide rods 75, at least one of which has upper and lower coil springs 76 thereon, FIGS. 2 and 3. It is here to be noted that rods 67 also have similar end springs 76', note FIG. 2. Rotatably mounted in plates 74 is a screw shaft 77, driven by a motor 78. The shaft 77 has upper and lower stop movement gaps 69', similar to 69 of FIG. 3.

The assemblage 31 comprises a yoke-shaped block 79, FIG. 6, slidable on rods 75 and having a bushing 80, FIG. 3, in threaded engagement with the shaft 77 for vertical feed of the assemblage 31 on the rods 75. Secured to the block is an offset bracket 81, FIG. 6, supporting an electric bulb socket 82 centrally of the block. In the socket 82 is a bulb 83, indicating the position of the aircraft on the chart 66, which may be termed a traveling radar target. This bulb is located on the chart 66 at 83', FIG. 1.

Welded to the blocks 72 is a vertical rod 84, on which a series of microswitches 85, 85'; 86, 86' are adjustably supported. These switches are actuated by a cam 87 fixed to a part of the block 79, FIG. 6. Centrally of the block 79 and in alinement with the bulb 83 is a ball bearing supported sleeve 88, note FIG. 6. This sleeve supports ends of actuating cables, later described. Weleded to the lower ends of the plates 30 of the frame is a horizontal rod 89, FIG. 2, supporting two pairs of microswitches 90, 90'; 91, 91', similar to the switches 85, 85'; 86, 86'. The switches 90, 90'; 91, 91' are actuated by a cam 92 on the lower portion of the motor 78, FIG. 2.

Each of the navigation units 32, 33 and 34 are common to the extent of having a bearing plate 93 spaced from the wall 25, tubular shafts 94 supported in 93 and 25, and arms 95 fixed to said shafts, FIGS. 2, 3, 4 and 7. Mounted on each arm 95 are two wide rollers 96, 97 and one end pulley 98, the rollers and pulley being shown schematically in full and dotted lines in FIG. 15 and this showing would be applicable to any one of the units 32, 33 and 34.

The movements of the navigation units 32, 33 and 34 are controlled by the movement of the assemblage 31 through cables 99 directed to 32, 100 directed to 33, and 101 directed to 34, ends of these cables being fixed in the sleeve 81, as indicated at 102 in FIG. 6 of the drawing. This movement is translated by 32, 33 and 34 into electrical information which, when read out on the corresponding instruments 37, 38 and 40, on the panel 26', indicate to the student the position of the aircraft on the chart relative to the navigation stations 32, 33 and 34.

Figure 7:
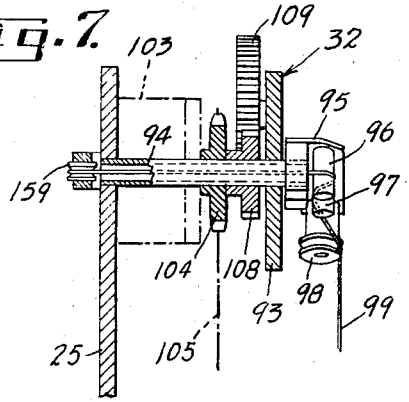
FIG. 7 is a diagrammatic enlarged section on the line 7—7 of FIG. 2, omitting parts of the construction.

Turning now to the unit 32, FIGS. 4 and 7, this unit comprises a potentiometer 103, briefly referred to hereafter as a "pot." upon which is attached a pulley 104, the chain 105 extending to a pulley 106 on the indicator 37 manually rotatable by a knob 107, FIG. 1. 103 and 104 are rotatable on the shaft 94 and the shaft 94 is free to rotate within the plates 25 and 93, by the tension imposed upon 95 by the cable 99. Internal within 103 is a wiper arm, the electrical signal of which is determined by its axial relationship to the outer casing of the pot. 103 and, thus, indicates the radial angle of the arm 95 relative to the selected radial position of the pot. 103, as generally with other potentiometers in the art.

The potentiometer 103 is a pyramid wound pot. which has an electrical null 180° apart. When the wiper arm is on the electrical null, the course indicating needle on the instrument 37 will be centered. Rotation of the wiper arm to either side of the electrical null will produce a corresponding deflection of the indicating needle to one or the other side of the center position, which will be apparent from a consideration of 37 in FIG. 1.

From the above, it then follows that a precise bearing or radial to or from the navigation unit can be established by selection of the radial position of pot. 103. Also incorporated in the machine is a precision approach course, commonly referred to as instrument landing system (I.L.S.), the sensitivity of which is four times that of navigation station 32. This increase in sensitivity is accomplished by a gear 108 rotating an idler 109 which, in turn, rotates a gear 110. A pot. 111 is identical to 103, but is retained in a fixed radial position establishing the radial bearing of the precision I.L.S. course. Movement of the arm 95 is amplified through gearing to move the wiper arm in pot. 111 with greater sensitivity than the wiper arm in pot. 103, thus increasing the accuracy of the I.L.S. approach course.

34 is identical to 32, utilizing the chain 112 on pulley 112' FIG. 3 to rotate pot. 113, similar to 103. Since there is no associated I.L.S., no additional pots. are required. The chain 112 extends to the instrument 38 and is rotated by the knob 114, FIG. 1.

The information produced at navigation unit 33 is not merely left and right deflection, but full 360° rotational information, utilizing a selsyn transmitter 115 on FIG. 4 and a receiver in instrument 40. The shaft 116 of the selsyn transmitter is coupled directly to tubular shaft 94 by direct bearing 117 and 118.

By interpreting instruments 37, 38 and 40, the student is aware of his position on the chart and can effect changes of that position through the movement of the stick 64. The stick 64 is used to change direction and attitude of flight. On the stick 64 is a shaft 119 slidable in the panel 26 and within plates 120 and 121, FIG. 9. Simultaneously, the shaft 119 can be rotated and limited in rotation in both directions by a pin 122 striking stop pins 123 and 124. Linear movement in and out through a rack 125 attached to a plate 126 on the shaft 119 and slidable on rods 126' drives a gear 127 attached to the shaft of a pot. 128. Electrical information from pot. 128 causes a change in altitude, vertical and air speed instruments 41, 42 and 44. Rotational movement of the shaft 119 drives a gear 129, in turn, driving a gear 129' on the shaft of a pot. 129" mounted in the plate 126. The electrical signal of 129" commands a motor 130 to rotate a semi-circular dial 130' to either the left or right, FIGS. 9 and 11. When the motor 130 rotates, it rotates a gear 131 actuating a pot. 132, through a gear 133 in rotating said dial. The electrical signal from the pot. 132 commands a motor 134, FIGS. 2 and 8, to rotate the instrument 39, thereby changing the apparent heading of the aircraft. Rotation of the motor 134 also rotates a cosine pot. 135. The electrical characteristics of a cosine pot. are such that they feed varying voltages of electricity proportionately to motors 78 and 71', FIG. 2, thereby determining the rotational relationship of screw 68 and screw 77. The corresponding movement of these two screws determines the angle of movement of the assembly 31 across the chart 66.

In addition, sliding movement of the shaft 119 through a linkage 136 drives a block 137, supporting a plate 137′ slidable on rods 137″ in and out, upon which plate rides an arm 138 connected to the horizon indicator rod 139, having a mounting, as at 139′, fixed on the periphery of the dial 130′, FIGS. 9, 11 and 12, the connection of 138 with 139 being through a bushing 138′ rotatably mounted on 139′. The rod 139 will indicate the position of the nose of the aircraft relative to the artificial horizon, which will be apparent from a consideration of 36 in FIG. 1 of the drawing. The horizon indicator 139 rotates with the motor 130, thereby simultaneously indicating the degree of bank of the aircraft and the position of the nose relative to the horizon. 136′ is simply a support for pivot point of 136, as seen at 140.

It will also be apparent, from a consideration of FIG. 9 of the drawing, that the stop pin 122 also limits sliding movement of 119 by engagement with the plates 120 and 121, as diagrammatically seen in FIG. 9. Movement of the pot. 127 by rack 125 electrically commands a motor 141, FIG. 8, on indicator 41 to rotate, causing a change in indicator altitude. The rate of change is electrically indicated on the instrument 44. Electrical information from second coupled pot. 128′, FIG. 11, electrically commands the instrument 42. In altimeter instrument 41, internal gearing of 41 indicates altitude in hundreds and thousands feet, using a thousand foot hand and hundred foot hand. The gearing, diagrammatically shown in FIG. 8, causes deflection of the thousand foot hand, one number for each thousand foot change of the hundred hand.

The throttle 63, FIG. 4, detailed in FIG. 13, is slidably mounted in sleeve 142 and connected to a rod 143. The rod 143 is held by spring friction of a wheel 144 against a wheel 145 attached to a shaft 146 of pot. 146′, FIG. 14. Linear movement of the rod 143 rotates the wheel 145, causing a pot. 146′ to feed electrical data also to instrument 41. Thusly, either the position or the throttle or the position of the shaft 119 determine the resultant rotation or absence thereof on the motor 141. In addition, the pot. 146′ feeds electrical data to the instrument 46.

The instrument 43 indicates the rate of change of the motor 134. The instrument 40 receives its primary rotational indication information from the navigation station 33. However, in function, the indicating needle on this instrument always points to the navigation station. This would be represented on the instrument 40 as a relative bearing from the nose of the aircraft. Therefore, heading information must be utilized to retain this bearing relationship. A chain 147, FIG. 2, rotates the outer housing of selsyn receiver in the instrument 40, thereby retaining the accuracy of the needle indication through changes in heading of the aircraft only, but not in radial position relative to the navigation station 33.

Figure 5:
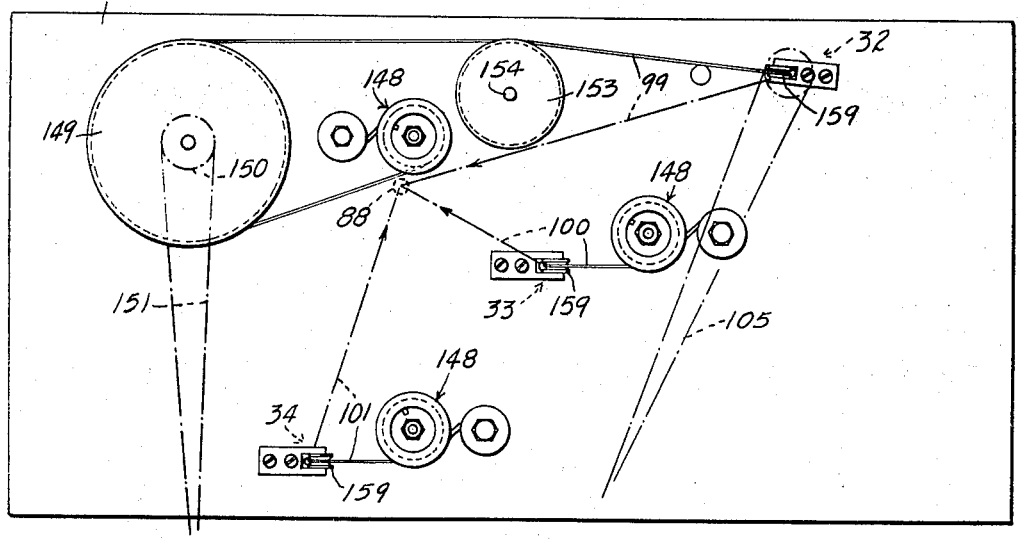
FIG. 5 is a diagrammatic view, generally taken along the line 5—5 of FIG. 3, and omitting parts of the showing, the illustration being on a reduced scale.

In addition, as assembly 31 moves, the cables 99, 100 and 101 are either withdrawn or re-wound onto spring spools 148, FIG. 5. The cable 99 serves two other functions in addition to bearing information at navigation station 32. The cable 99 passes around a pulley 149, which is connected to another pulley 150, FIG. 5, and through a chain 151 to a pulley 152, FIG. 2. Rotation of the pulley 149 thus imparts movement of the indicator 45 and is so dimensioned that the linear travel of the cable 99 is read out in distance either to or from navigation station 32. Also the cable 99 is wrapped around a pulley 153, FIG. 5, which is attached to a shaft 54 on a pot. 155, FIG. 2. Movement of the cable 99 causes the pulley 153 to rotate and electrical information from the pot. 155 is fed to the horizontal needle on the instrument 37. In addition, referring to FIG. 8, a pot. 156, coupled to an altimeter gear 157 through a gear 158, also feeds electrical information to the horizontal needle on the instrument 37. The result of these two signals produces the glide path or vertical height above the ground during a precision approach, this height by a product of distance and altitude. The cables 99, 100 and 101 pass over pulleys 159 and through the tubular shaft 95 to the rollers 96 and 97 and the pulley 98, FIG. 7, the cable passing between 96 and 97, as diagrammatically seen in FIG. 7 and also schematically shown in FIG. 15.

Referring to FIG. 15, the roller 98 is used to extend the lever arm of the arm 95 and the cable is only in engagement with the roller 98 when the assembly 31 is of some distance away from the navigation station. As demonstrated in FIG. 15, as the assembly 31 approaches and passes over the center of my navigation station, the cable leaves the pulley 98 and changes its position, as indicated, to a point at position 4 where, when passing over the center of the tubular shaft 95, the shaft is caused to rotate 180° and, as the assembly 31 continues to move, the cable follows through positions 5, 6 and 7, until approximately four miles from the navigation area, the cable re-enters the pulley 98.

It is apparent now that, as the assembly 31 traverses in any position on the chart 66, the three cables 99, 100 and 101 are constantly relating the position of the assembly 31 to the associated navigation stations. The feed out and retraction of the cables allows their passage anywhere on the chart 66, including the direct passage over the center of any of the navigation stations and, in this, the course of random travel over the chart, the bearing assembly 31, FIG. 6, allows the cables to retain their direct bearing to the various navigation stations and avoid twisting or involvement one with the other.

Figure 2:
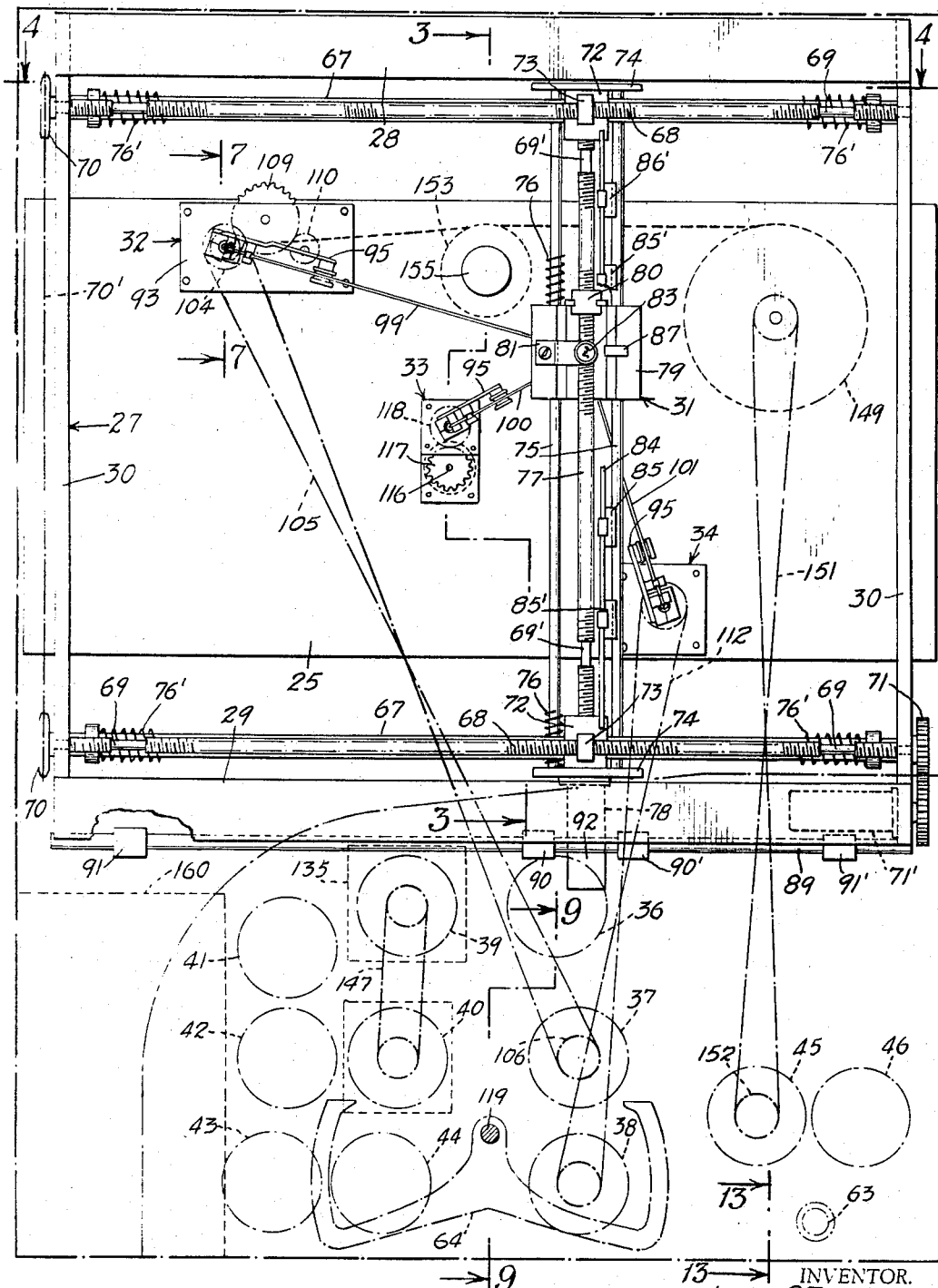
FIG. 2 is an enlarged partial section on the line 2—2 of FIG. 1, showing only part of the internal mechanism of the apparatus and indicating in dot-dash lines an outline of part of the front of the casing of the apparatus.

In the course of travel of the assembly 31, should the student inadvertently approach to within one mile of the opening 65, or the edge of the chart 66, microswitches 86, 86′ in FIG. 6, and 91, 91′, FIG. 2, will be actuated by cam 87, FIG. 2, causing the light 48 on the panel 26′ FIG. 1 to light, indicating that the aircraft is approaching the edge of the chart 66. Should no corrective turn be made, assembly 31 will stop further linear movement of the threaded engagement 73 and 80 passing off of the threaded portion on rod 77 and 76 and into the blank space 69′ and 76′, indicated in FIG. 2. This disengagement will stop linear movement, until such time as a heading of the aircraft is effected that will direct assembly 31 to move away from the edge of the chart 66, whereby springs 76 and 76′ will cause re-engagement with the threaded parts 80 and 73 with threaded rods 77 and 68 causing the assembly 31 to start moving away from the edge of chart 66. In effect, this is a fail-safe system, preventing damage to the apparatus.

Considering FIG. 2 of the drawing, the dotted outline 160 in the lower lefthand corner, indicates a circuit box containing the circuit wires and the like controlling the various electrical parts of the apparatus.

As an illustrative flight, we are commencing a flight from 83′, FIG. 1, and will illustrate step by step each action required by the pilot and each function of the instruments to guide this flight through the route assigned to landing at the airport 161.

It is first pointed out that the position light 83 can be either on or off, as selected by the switch 58, to show to the pilot at all times his position on the chart. The pilot sits at the apparatus at location 83′. Before take-off, the pilot must check that his landing gear 55 is down, switch 56, his flaps are down, switch 55, and he must do a pre-flight check of his magneto switches 59 and 60, effected by turning them off one at a time and reading a corresponding r.p.m. drop on instrument 46. Also he must verify that his carburetor heat 62 is functioning by pulling out carburetor heat knob 62 and reading a corresponding r.p.m. drop on instrument 46. Having determined that his aircraft is ready to fly, he would then check his route clearance to set up his navigation instruments and proceed to take off.

For illustration, his clearance for instruction for route of flight requires him to take off, climb to two thousand feet, intercept Victor 107, which is the 090 radio navigation station 32, fly to the intersection of Victor 107 and Victor 106, turn south on Victor 106 to navigation station 34 cross over 34 and turn to the 309 radio of that station and proceed inbound on the precision approach course to the airport 161, FIG. 1. In the course of this flight, we will illustrate the function of all of the navigation instruments and of the aircraft instruments.

The pilot now, having received his route of flight instruction, turns on engine switch 57, advances throttle 63, waits for air speed build-up instrument 42, establishes a positive upgrade on instrument 44 and is, at this point, off the ground and flying.

He maintains his heading by referring to instrument 39 and turns to a heading of 150° to intercept Victor 107.

Having started up, he now retracts his landing gear switch 56, retracts his take-off flap switch 55 and reduces his power on throttle 63 to climb setting on instrument 46. He now, on knob 61, sets the desired frequency to receive navigation station 32 and with the knob 107 sets on the indicator instrument 37 the course 090.

Having done this, the vertical needle of instrument 37 will be deflected to the right, showing him that, in order to establish himself on 090 line, he must fly right. Still continuing to climb upon reaching two thousand feet, he further reduces power with throttle 63, levels off his airplane by forward movement of the wheel 64, which results in an increase in air speed indication on the instrument 42 as the aircraft is no longer going uphill and continues to maintain a heading of 150° by correcting heading to rotary movement of the wheel 64.

As he proceeds, he will know that the vertical needle on instrument 37 begins to return to its center position and, when it arrives at the center position, it indicates that he is on Victor 107 line and must turn left to the direction of 090 to maintain flight along this line.

Various wind conditions can be put into the apparatus to blow him off course. In this case, we have set in a north wind and, as our pilot flies on this heading of 090, he will soon find that the vertical needle on instrument 37 has moved to the left, indicating that he must turn left to regain his track on Victor 107. He now turns left to a heading of 070 and watches the needle return to its center indication, at which point he will turn right to a head of 080, flying internally on a head north of 090 to offset the drop that he has encountered from the north wind. The result of his direction of flight and the effect of the north wind should cause him to fly directly east on Victor 107. He has been instructed to go to the intersection of Victor 107 and Victor 106 and turn southwest on Victor 106 to naviagtion station 34. By referring to his instrument 45, which at this point reads "14," he knows that he is two miles from the interesection of Victor 106, which is sixteen miles from station 32.

He now rotates knob 114 of instrument 38 and selects a heading of 190°, which is the heading of Victor 106. When the instrument 45 reads 16 nautical miles, the vertical needle on instrument 38 will also have centered and our pilot turns right to a heading of 190° to fly directly to station 34. He is then instructed to hold at the intersection he is approaching. The intersection is the intersection of the 112° radio of station 32 and Victor 106.

So, now while continuing to stay on course using instrument 38, he rotates knob 107 to the heading indication of 112°. When doing this, he will find that instrument 37 is indicating that the needle on 37 has moved to the right, indicating that he has not yet reached the intersection. As he flies, that needle will approach center position and, when the needle on instrument 37 is centered, it indicates to the pilot that he is at the intersection, where he proceeds to make a right turn to fly the circular holding pattern, as indicated on the map.

After holding for ten minutes by flying this race track pattern, as indicated at position 162 on FIG. 1, he then turns back to his heading of 190° and proceeds along Victor 106 to navigation station 34. During this flight, the "TO" and "FROM" indication in instrument 38 is indicated to show him that he is flying to the station. Further along, he crosses over the station and the indication changes to "FROM," indicating to him that he has passed the station.

He now proceeds to turn right to intercept the precision approach course and make a precision approach to airport 61. He turns right to a heading of 300 and notes that his needle on instrument 40 is pointing to the left of the aircraft nose. He turns left to the center instrument 40 on his aircraft nose and knows that, by following instrument 40, he will arrive at the outer marker of the I.L.S. to airport 161. He now goes to knob 61 and selects the appropriate frequency for the I.L.S. course of airport 161.

Precision approach will be done on instrument 37 which, after selecting the proper frequency, will now indicate a "Fly Right" condition. At this time, he turns on switch 53, energizing the glide path horizontal needle on instrument 37. At this point, the horizontal needle will move up, showing him that he is below the glide path and he knows, by referring to his charts, that he will intercept the glide path at the L.O.M. outer marker on the approach course to the airport 161. Continuing to fly instrument 40 and dropping slightly right, he eventually centers the vertical needle on instrument 37 and has centered the needle on instrument 40. On the heading of 309, he finds that instrument 40 continues to point straight up and that the vertical needle of instrument 37 is remaining centered. Flying along on the heading of 309, he knows, by referring to his charts, that the airport 161, L.O.M., is nine miles from navigation station 32. He sees that instrument 45 is showing eleven miles and, therefore, knows that he is two miles from the L.O.M. At this point, he lowers his landing gear, switch 56, lowers his flaps, switch 55 and applies carburetor heat to his engine knob 62.

As he passes over the L.O.M., the action of cam 87 on FIG. 2 actuating switch 82 on FIG. 3 and cam 92 actuating switch 90' on FIG. 2 operating simultaneously actuates his outer marker indicator 50, FIG. 1, and also produces an audio tone, indicating his passage over the outer marker. At this point also, the horizontal needle on instrument 37 will have centered horizontally, indicating that he is intercepting the glide path. He will then reduce power by pulling out throttle 63 to establish a rate of descent on the instrument 44 to start reducing his altitude indicator on the instrument 41 and thereby remain centered on the glide path vertically while he remains centered left and right horizontally, both indications on instrument 37.

Should he shut off too little power and not descend fast enough, the horizontal needle will move downward, indicating to him that he is above the glide path and, by removal of more power, throttle 63, he increases his rate of descent, instrument 44, until such time as he has again intercepted and centered the horizontal needle. Then, adding power with throttle 63, he adjusts his rate of descent, instrument 44, to coincide with the rate of descent of the glide slope to keep the horizontal needle centered while simultaneously keeping the vertical needle centered. Arriving at the airport 161, he will find that he has been forced, in order to keep the horizontal centered, to descend to approximately two hundred feet and he arrives at the edge of the runway, the marker light 51, by the action of the cam 87 actuating switch 85' and cam 92 actuating switch 90 will light and admit an audible tone, informing him that he is over the approach end of the runway, completing his flight.

During his flight, if he has left switch 58 off, the position light on the chart will be out and he must fly entirely by referring to his instruments. If, however, he or his instructor desires to see his position by momentarily pressing switch 54, or turning on switch 58, the light 83' will appear on the chart, showing his exact position over the ground.

Since the intention is not to land at this point, the pilot is informed that the weaher at the airport 161 is below landing minimums. The pilot must execute a mixed approach procedure, applying full power with throttle 63, establishing upgrade on instrument 44, retracting gear and flap switches 55 and 56 and proceed to some designated point on the chart where he will be told to hold, until such time as the weather conditions permit a landing at the airport 161.

In the above described flight, the assembly 31 has been moving over the back of the chart covering a large area of the chart by the means provided, including the instruments responding to the pilot's operation of the main controls and the switches, as described. During this flight, any movement by the pilot or student of the controls will result in a corresponding change in the instrument indications on the panel exactly as they would in a aircraft in flight, thus, giving the pilot or student the feel of acually flying the aircraft.

The foregoing is illustrative of one of many different types of approaches to airports. On the chart 66 are illustrated a series of stars, which might designate airports, to which approaches can be made by the student. However, in this event, the operation would be along the lines noted above, except that the approach may utilize the navigation station 32 or 34 or the automatic directional finding station 33 and instrument 40. There are several different types of approaches using either instrument 37, 38, 40 or 45 and combinations of these instruments which enable the pilot to precisely position himself over any airport or any spot on the map by following the correct procedures for arriving at that point.

For purposes of description, the frame 27 may be said to comprise crossed guides and feeds for movement of the target assembly. Further, the controls 53–60 may be said to rotate various components of the aircraft as, for example, the flaps, landing gear, magnetos and the like.

Having fully described my invention, what I claim as new and desire to secure by Letters Patent is:

1. An aircraft flight simulating apparatus comprising a casing having, in the front wall thereof, a translucent flight chart, an instrument panel at the lower portion of the casing, a plurality of attitude and navigation instruments visible on said panel, a manually operated flight control stick slidably and rotatably mounted in the apparatus, a manually operated throttle slidably mounted in the apparatus, a target assembly, supporting a light bulb, including means for feeding the same over the major portion of the inner surface of said chart, a plurality of navigation control units in said casing controlling operation of said means, an artificial horizon assembly in the casing, including a rod registering with one of said instruments, means including said stick and mechanical and electrical actuators for controlling said last named assembly in moving said rod vertically and angularly in said one instrument, cables, from spring tension sources, operatively engaging said units and having ends retained and freely rotatable in the target assembly in alinement with said light bulb in controlling operation of said units, means for actuating the first named means for movement of the target assembly and operation of each of said units, switches controlling start of the apparatus and various aircraft components, and means on the chart registering with one of said units for designating at least one airport and an approach thereto.

2. An apparatus as defined in claim 1, wherein said target assembly includes a freely rotatable mounting for ends of cables extending to and operatively engaging rotatable arms on each of said units.

3. An apparatus as defined in claim 1, wherein said artificial horizon assembly is actuated by said stick and electrical components in imparting swinging and rotary movement to said rod.

4. An apparatus as defined in claim 1, wherein said first named means comprises a rectangular frame supporting spaced pairs of slide rods and feed screws and a slide rod and screw assembly joining said first named pair and movable on the feed screws and slide rods of the first named pair, said target assembly being mounted on the rod and screw assembly and fed by the screw of said assembly, said light bulb characterizing an aircraft, means on the target assembly in alinement with said light bulb for rotatably supporting ends of cables extending to and operatively engaging rotatable arms on each of said units, and motors for driving all of said feed screws.

5. An apparatus as defined in claim 4, wherein all of the feed screws have stop movement gaps at ends thereof stopping feed movement of said target assembly, and means including springs on ends of the slide rods and switches adjacent said ends establishing re-coupling engagement with said feed screws in withdrawal of the target assembly from positions controlled by said caps.

6. An apparatus as defined in claim 1, wherein each navigation control unit comprises a tube supporting, at one end, an arm having radially arranged rollers and a pulley at the end of the arm, and cables operatively engaging the rollers and pulley and extending through said tube and over an idler roller at the other end of the tube to independent spring wound spools, with free ends of the cables rotatably supported in said target assembly to constantly establish the relative bearing from the navigation stations to the radar target.

7. An apparatus as defined in claim 6, wherein two of said units are in operative engagement with navigation control instruments of the panel.

8. An apparatus as defined in claim 7, wherein said units include electrical means controlling operation of the apparatus.

9. An apparatus as defined in claim 1, wherein said throttle actuates a potentiometer feeding electrical data to a tachometer instrument.

10. An apparatus as defined in claim 6, wherein one roller of each of said arms is in axial alinement with said tube, maintaining this position in swinging movements of the arm in operation of the apparatus.

11. An apparatus as defined in claim 1, wherein said stick operates linkage for swinging movement of said rod, said stick including handgrip means, and means limiting forward and sliding movement of said stick.

12. An apparatus as defined in claim 1, wherein rotation of said stick actuates electrical means commanding a motor controlling rotation of said rod, and means for checking rotary movement of the stick in both directions.

13. An apparatus as defined in claim 11, wherein sliding movement of said stick controls operation of two potentiometers.

14. An aircraft flight simulating apparatus comprising a casing having, in the front wall thereof, a flight chart, an instrument panel at the lower portion of the casing, a plurality of attitude and navigation instruments visible on said panel, a manually operated flight control stick slidably and rotatably mounted in the apparatus, means checking sliding and rotary movement of said stick, a manually operated throttle slidably mounted in the apparatus, a target assembly including means for feeding the same over the major portion of said chart, means for driving said feeding means, a plurality of navigation control units in said casing controlling operation of said second named means, means characterizing an aircraft movable by said target assembly with respect to the area of said chart, an artificial horizon assembly in the casing including a rod registering with one of said instruments, means including said stick and mechanical and electrical actuators for controlling said last named assembly in moving said rod vertically and angularly in said one instrument, said units being located at airports represented on said chart and at least one landing station to one airport on the chart, cooperating means between said target assembly and said units controlling movement of the target assembly by said second named means, and switches controlling start of the apparatus and various aircraft components in simulating the flight of an aircraft.

15. An apparatus as defined in claim 14, wherein said second named means comprises crossed target assembly guides and feeds, with means for independently driving the feeds of said crossed guides.

16. An apparatus as defined in claim 14, wherein the instruments of said panel include instruments designating artificial horizon, guide path and O.B.I., course, direction, altimeter, air speed, turn, climb, distance and tachometer.

References Cited

UNITED STATES PATENTS

| | | | |
|---|---|---|---|
| 2,526,693 | 10/1950 | Rust | 35—10.2 |
| 2,529,468 | 11/1950 | Dehmel | 35—10.2 |
| 2,536,474 | 1/1951 | Susdorf | 35—10.2 |
| 2,809,444 | 10/1957 | Woods et al. | 35—10.2 |
| 2,841,885 | 7/1958 | Hall | 35—10.4 |
| 2,960,906 | 11/1960 | Fogel | 35—10.4 X |
| 3,208,336 | 9/1965 | Vago | 35—10.2 X |
| 3,229,017 | 1/1966 | Snyder | 35—10.4 |

MALCOLM A. MORRISON, Primary Examiner

ROBERT W. WEIG, Assistant Examiner

U.S. Cl. X.R.

35—12